Dec. 13, 1966   J. CHIBRET ET AL   3,291,348
METHOD FOR PACKAGING, MIXING AND DISPENSING
A PLURALITY OF SUBSTANCES
Filed Sept. 26, 1963

INVENTORS
JEAN CHIBRET & RENÉ CHIBRET

Jacobi & Davidson
ATTORNEYS

United States Patent Office 3,291,348
Patented Dec. 13, 1966

3,291,348
METHOD FOR PACKAGING, MIXING AND DISPENSING A PLURALITY OF SUBSTANCES
Jean Chibret and René Chibret, Puy de Dome, France, assignors to Laboratoires Chibret, Puy de Dome, France, a company of France
Filed Sept. 26, 1963, Ser. No. 311,813
Claims priority, application France, Sept. 27, 1962, 910,591
2 Claims. (Cl. 222—145)

This invention concerns the packaging and dispensing of substances which, when mixed, have only a stability of limited duration, inconsistent with normal commercial storage delays. The invention is more particularly concerned with pressurized containers for such substances, of the so-called "aerosol container" type.

Pressurized containers of the "aerosol" or siphon type are widely used and offer numerous advantages which are highly appreciated by the public, especially as regards the hygienic distribution conditions of the products packed in this manner. However, in the past this kind of container could not be used for mixtures of substances which become altered in characteristics after a relatively short period of reciprocal contact. Such substances include a great number of pharmaceutic products, as well as varnish, paints, or the like, and more particularly to those products based on ethoxyline resins to which a hardener has to be added prior to their utilisation.

The preceding remarks apply also to certain edible fluid products various constituents of which lose some of their flavour and taste and, in certain cases, even adulterate if they are not kept in the anhydrous state and sheltered from air till the time when they are to be used and when they are, generally, mixed with water. This is specifically true for milk, coffee, and tea, as well as for a certain number of fruit juices. It is current practice in the pharmaceutic field to prepare certain active products in the lyophilized form and to conserve them thus in the solid anhydrous state, sheltered from air, until they are to be dispensed, at which time they are generally mixed with physiological salt solution, condensed water or some other solution.

It is an object of the invention to permit the preservation and distribution under pressure of substances to be mixed extemporaneously in containers obtained from current commercial articles and according to a method which can easily be carried out.

The method in accordance with the invention comprises the steps of introducing one of the substances to be mixed into a mixing and dispensing container the capacity of which exceeds the volume of the mixture of these substances, and which is closed by an externally controlled dispensing valve; introducing another one of these substances, in form of a liquid in an auxiliary container having a capacity exceeding the volume of this liquid and sealed by closing means which can be directly connected to the dispensing valve; introducing into the auxiliary container a quantity of gas which, when measured under the volume of the empty auxiliary container, has a pressure at least equal to the initial dispensing pressure in the mixing container; directly connecting the inner spaces of said containers while preventing any communication between said spaces and the outer atmosphere for extemporaneously mixing the substances by transferring at least a predetermined aliquot part of the liquid from the auxiliary container into the mixing container under the action of the pressure of the gas and simultaneously raising the pressure in the mixing container up to the value of said initial dispensing pressure; and then disconnecting said containers and distributing under pressure the extemporaneous mixture thus obtained through the valve of the mixing container.

Before being directly connected to the auxiliary container the mixing container may contain a quantity of gas which, when measured under the volume which remains free in the mixing container, after transferring of the liquid and prior to the dispensing of the extemporaneous mixture, has a pressure equal to the initial dispensing pressure.

The auxiliary container may also contain a quantity of gas which, when measured under a volume equal to the sum of volumes which remain free in the auxiliary container and the mixing container, has a pressure equal to the initial dispensing pressure; in this case the containers are maintained in the directly connnected condition until all of the liquid has been transferred and the internal pressures in the containers are balanced.

The gas enclosed under pressure may be constituted by at least one gas of the group comprising air, nitrogen, carbon dioxide, the rare gases of the atmosphere, hydrocarbons, halogenated hydrocarbons, as well as mixtures, compounds, and derivatives thereof.

An atomizing nozzle may be adapted on the dispensing valve for dispensing the liquid in the dispersed form of the extemporaneous mixture, or a nozzle for dispensing the liquid in the form of a jet.

The substance contained in the mixing container may be in the solid state, if it forms with the liquid of the auxiliary container a homogenous liquid mixture; it may also be in the state of a solution or a dispersion.

The auxiliary container may have the same capacity as the mixing container which allows for producing economic packages, of regular shape and for using a single type of container.

The initial dispensing pressure may be comprised between about 2 and 20 kg./cm.$^2$. More particularly, it is possible to introduce gas into the auxiliary container under a pressure of 10 kg./cm.$^2$ and into the mixing container under a pressure of 5 kg./cm.$^2$, the initial dispensing pressure being 7 kg./cm.$^2$.

It is another object of the invention to provide, as a novel product of manufacture, a package to be used for preserving and dispensing substances which are to mixed extemporaneously, said package comprising at least two internal pressure resisting containers obturated by individual closure means and adapted to be directly connected to each other without communicating with the outside. These containers each contain one of the substances the mixture of which has only a shortlasting stability, at least one of the containers comprising dispensing means for dispensing an extemporaneous liquid mixture of said substances, pressurized gas being contained at least in another one of these containers.

The dispensing means may comprise a manually controlled valve for delivering a liquid in predetermined quantities.

The closing means of the containers may be constituted by container valves of the "aerosol" type having a male and a female end, respectively, the dispensing means comprising a head with a dispensing nozzle which can be mounted on the end of the valve which seals the container containing the substances to be dispensed in the form of an extemporaneous liquid.

The closing means of one of the containers may comprise a needle provided with an axial channel controlled by a valve (e.g. an "aerosol" valve the male end of which is shaped with a sharply angled bevel), and those of at least one other container may comprise a diaphragm to be perforated by said needle, without establishing any communication with the outside, according to the usual packaging practice for antibiotics.

The containers may be made of glass, and advantageous use may be made of commercial containers produced for "aerosol" packaging the neck of which is provided with a ring for the crimping of a conventional "aerosol" valve.

The package may comprise at least two storage containers containing the substances to be mixed extemporaneously and gas under a pressure at least equal to the initial dispensing pressure, combined with at least one other container for mixing these substances and dispensing their extemporaneous mixture, said other container being adapted to be directly connected to the storage containers and containing only gas under the final dispensing pressure. Thus it becomes possible to prepare repeatedly in a unique mixing container an extemporaneous mixture of substances taken from one set of storage containers, or else to fill several extemporaneous mixture containers from a single set of storage containers. In this case, the storage containers may be equipped with metering dispensing devices such as metering valves for "aerosol" containers, or else provide filling level indexes for the various substances on transparent mixing containers.

The accompanying drawing shows diagrammatically various steps of the method according to the invention.

Figure 1:
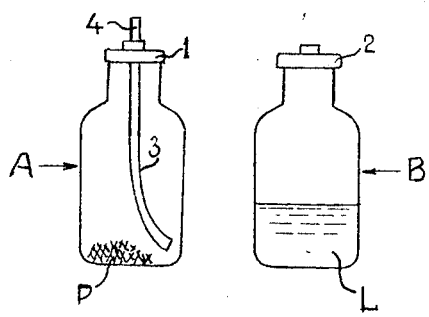
FIG. 1 shows a mixing bottle and an auxiliary bottle which constitute a package in accordance with the invention.
Figure 2:
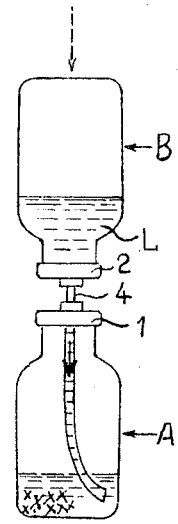
FIG. 2 shows how the auxiliary bottle and the mixing bottle are being directly connected during the mixing operation.
Figure 4:
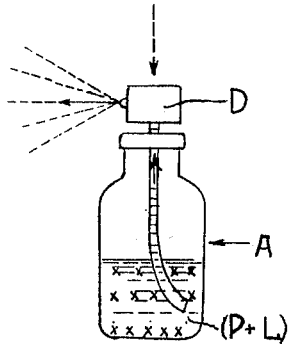
FIG. 4 shows the mixing bottle equipped with a dispensing head, during the dispensing of an extemporaneous mixture.
Figure 3:
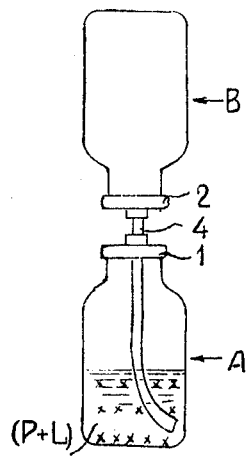
FIG. 3 is a similar view to that of FIG. 2, at the end of the mixing operation.

By way of a numerical example and according to the accompanying drawing, two identical glass bottles are used which are currently sold for "aerosol" packages and which resist a static pressure of about 20 kg./cm.$^2$; these bottles are provided with a crimping neck for a standard "aerosol"-type valve. These bottles have a brim capacity of 17 cc. Their actual useful capacity is 16 cc. once the valve has been crimped onto the neck. Bottles sheathed with plastic material may also be used advantageously. Introduced into the mixing bottle A is 0.5 cc. of a powder P, for instance a quaternary ammonium, an antibiotic, a lyophilized vaccine prepared from at least two influenza viruses comprising the viruses A1, A2, B and para influenzae, the bottle A is closed by crimping an "aerosol" type valve 1 having a male end piece and a plunger tube, and through this valve nitrogen is introduced into the bottle A up to a pressure of about 5 kg./cm.$^2$ (4.75 kg./cm.$^2$ theoretically). 5 cc. liquid substance L are introduced into auxiliary bottle B, for example a physiological salt solution, or a solution of quaternary ammonium. The bottle B is sealed once an "aerosol" type valve 2 having a female end piece and no plunger tube has been crimped into it, said valve is shaped so as to be complementary to the male end piece of valve 1, and through the valve 2, nitrogen is introduced into bottle B up to a pressure of about 10 kg./cm.$^2$ (10.2 kg./cm. theoretically) (FIG. 1).

Thus substances P and L are preserved in a perfectly safe manner, sheltered from the air and any other pollution, until the time when they are to be used.

To achieve the extemporaneous mixture of substances P and L, the valves of bottles A and B are directly connected, bottle B being disposed above bottle A. A manual pressure is applied to the bottom of bottle B to ensure the simultaneous opening of valves 1, 2 and the flow of liquid L from bottle B to bottle A, while the pressure in bottle B falls from 10 to about 7 kg./cm.$^2$ whereas pressure in bottle A is increased correspondingly from about 5 kg./cm.$^2$ to 7 kg./cm.$^2$ (FIG. 2). When all of liquid L has flowed out, bottle A contains 5.5 cc. of the mixture $P+L$ constituted by powder P and liquid L under the initial dispensing pressure of the nitrogen (about 7 kg./cm.$^2$) while bottle B is emptied of its liquid, but contains nitrogen under the same pressure of about 7 kg./cm.$^2$ (FIG. 3).

Bottle B is then withdrawn and an atomizing head D is applied to valve 1. The liquid mixture thus extemporaneously prepared can be sprayed in the same manner as a normal "aerosol" solution, and be projected in the jet form, as with a conventional siphon. During the dispensing of the mixture $P+L$, the volume of this mixture decreases from 5.5 cc. to 0 cc. in bottle A while the nitrogen pressure decreases from about 7 to 5 kg./cm.$^2$ (FIG. 4).

The present invention permits the use of two identical bottles which, if desired, can be sold as a single package. Each of the bottles can be of relatively small volume and can have relatively low internal pressures. This can be contrasted with prior art arrangements where at least one of the bottles had to be of large volume and where at least one of the bottles had to have a high internal pressure.

In the case of pharmaceutic products the bottles may be sterilized either before or after being filled. If one takes care to sterilize the valve end pieces prior to their being directly connected, which can be done without difficulty by means of conventional disinfectants, in particular those currently used for cleansing the perforable plugs for antibiotic preparations, the desired degree of sterility is preserved during the extemporaneous preparation of the mixture.

Numerous modifications can be made by those skilled in the art without departing from the scope of this invention.

Thus, in the case of sufficiently fluid substances, a valve can be crimped on to an empty preserving container while the gas and the substance under pressure are introduced into the bottle through the valve according to the conventional "aerosol" packaging technique for filling containers under pressure.

If the solid substance is insoluble in the liquid, it is preferable to use a powder the particles of which have a dimension not greater than three microns, specifically in the case of medicaments the inoculation of which is effected by spraying.

What is claimed is:

1. A method for packaging, extemporaneously mixing and then dispensing under a decreasing dispensing pressure, two substances of which at least one is a liquid, said method comprising the steps of:

providing two containers of identical size and shape, one of said containers being a dispensing container and the other of said containers being an auxiliary container;

providing at one end of said dispensing container, a valve having an outlet piece displaceable by manual pressure from a first closed position to a second opened position;

providing at one end of said auxiliary container, a valve having an outlet piece displaceable by manual pressure from a first closed position to a second opened position;

one of said outlet pieces being formed as a male part and the other of said outlet pieces being formed as a female part, said outlet pieces thereby being interconnectable with one another;

introducing a measured volume of the liquid substance into said auxiliary container and introducing a measured volume of the other substance into said dispensing container, the combined volumes of said two introduced substances being substantially smaller than the capacity of said dispensing container;

further introducing into said dispensing container an inert gas under a pressure higher than atmospheric pressure but lower than the required initial dispensing pressure value;

further introducing into said auxiliary container an inert gas under a pressure capable of completely expelling the liquid from said auxiliary container into said dispensing container and of thereby increasing the gas pressure in said dispensing container to said initial dispensing pressure value;

coupling said auxiliary container and said dispensing container together with the interior of one of such containers communicating with the interior of the other, such coupling being effected by connecting said male and female valve outlet pieces and exerting a manual pressure thereupon for displacing said valve pieces toward their respective opened positions, thereby entirely expelling the liquid substance from the auxiliary container into said dispensing container, and simultaneously increasing the gas pressure in said dispensing container to said initial dispensing pressure value;

uncoupling said two containers from each other;

mounting a spray head on the outlet piece of said dispensing container valve; and, actuating said spray head to thereby dispense the mixture of said two substances from said dispensing container in the form of an aerosol spray.

2. A method for packaging, extemporaneously mixing and dispensing under pressure, two medicamental substances adapted to be mixed with each other only immediately prior to use, and to be dispensed in spray form after mixing under a pressure decreasing from a predetermined initial dispensing pressure value; one of said substances being a powder and the other of said substances being a liquid, said method comprising the steps of:

introducing a measured volume of said powder into a dispensing container having a capacity substantially greater than said measured powder volume;

providing said dispensing container with a valve having a male outlet piece adapted to be operated by manual pressure for opening said valve;

introducing a measure volume of liquid into an auxiliary container having the same size and shape as the dispensing container, said measured volume of liquid being substantially smaller than the capacity of said auxiliary container, and the combined volumes of said powder and said liquid being substantially smaller than the capacity of either of said containers;

providing said auxiliary container with a valve having a female outlet piece connectable with said male outlet piece and being operable by manual pressure for opening of said auxiliary container valve;

introducing into said dispensing container an inert gas under a pressure less than said initial dispensing pressure;

introducing into said auxiliary container an inert gas under a pressure higher than said initial dispensing pressure;

said dispenisng container pressure and said auxiliary container pressure being interrelated in such a manner that when said containers are coupled with the interior of one communicating with the interior of the other, said liquid from said auxiliary container will be expelled into said dispensing container and the pressure in each of said containers will be equalized substantially at said initial dispensing pressure value;

connecting the interior of said auxiliary container with the interior of said dispensing container by interconnecting said male outlet piece with said female outlet piece and exerting manual pressure thereupon, thus entirely expelling the liquid from said auxiliary container into said dispensing container and simultaneously increasing the pressure in said dispensing container to said dispensing pressure value;

separating said male and female valve outlet pieces from each other, thereby uncoupling said auxiliary container from said dispensing container;

applying a spray head onto said male valve outlet piece; and, depressing said spray head to dispense the mixture of said two substances from said dispensing container as an aerosol spray.

References Cited by the Examiner

UNITED STATES PATENTS

| | | | |
|---|---|---|---|
| 3,080,094 | 3/1963 | Modderno | 141—19 X |
| 3,181,737 | 5/1965 | Chaucer | 141—20 X |
| 3,186,450 | 6/1965 | Beall et al. | 141—319 |
| 3,187,787 | 6/1965 | Kerr | 141—348 |

FOREIGN PATENTS

| | | |
|---|---|---|
| 517,818 | 3/1955 | Italy. |
| 568,139 | 10/1957 | Italy. |

OTHER REFERENCES

Modern Beauty Shop, November 1960, pp. 48.

LAVERNE D. GEIGER, *Primary Examiner.*

E. EARLS, *Assistant Examiner.*